United States Patent [19]

Rose et al.

[11] 3,998,389
[45] Dec. 21, 1976

[54] APPARATUS FOR GAS TREATMENT OF LIQUIDS

[75] Inventors: Clark B. Rose, Chicago; Richard B. Kelley, Rockford, both of Ill.

[73] Assignee: Richards of Rockford, Rockford, Ill.

[22] Filed: July 31, 1975

[21] Appl. No.: 600,727

Related U.S. Application Data

[63] Continuation-in-part of Ser. No. 273,181, July 19, 1972, Pat. No. 3,771,724, and a continuation of Ser. No. 412,629, Nov. 5, 1973, abandoned.

[52] U.S. Cl. .......................... 239/214.21; 239/221; 239/419.5; 239/425.5; 261/120
[51] Int. Cl.² .................. B05B 3/08; B05B 3/10; B05B 7/28; B01F 7/22
[58] Field of Search ................ 239/16, 23, 77, 78, 239/182, 214, 215, 214.11, 219–221, 214.21, 222.11, 223, 224, 380, 500, 518, 440, 419.5, 425.5; 210/15, 218, 242; 261/24, 119 R, 120

[56] References Cited
UNITED STATES PATENTS

| | | |
|---|---|---|
| 1,859,770 | 5/1932 | Fleischer .................. 239/214.21 X |
| 1,952,269 | 3/1934 | Lundquist ..................... 261/120 X |
| 3,552,725 | 1/1971 | Ray ............................. 261/120 X |
| 3,572,658 | 3/1971 | Ravitts ............................ 239/16 X |
| 3,622,074 | 11/1971 | Frohwerk .................... 261/120 X |
| 3,640,514 | 2/1972 | Albritton ...................... 261/120 X |
| 3,735,926 | 5/1973 | Ravitts ............................... 239/16 |
| 3,771,724 | 11/1973 | Rose et al. ........................ 239/221 |

Primary Examiner—Robert S. Ward, Jr.
Attorney, Agent, or Firm—Henry L. Brinks

[57] ABSTRACT

A pressure nozzle produces a liquid-spray-chimney in the form of an inverted, substantially frusto-conical configuration from the surface of a parent body of liquid such as a pond, channel, and the like. A mechanically generated draft of gas is produced within the liquid-spray-chimney by power driven fan means having an exhaust outlet positioned within the frusto-conical spray trajectory configuration. The spray droplets in the liquid-spray-chimney are of a size sufficiently large to reduce entrainment of the droplets in the forced-draft of gas.

27 Claims, 6 Drawing Figures

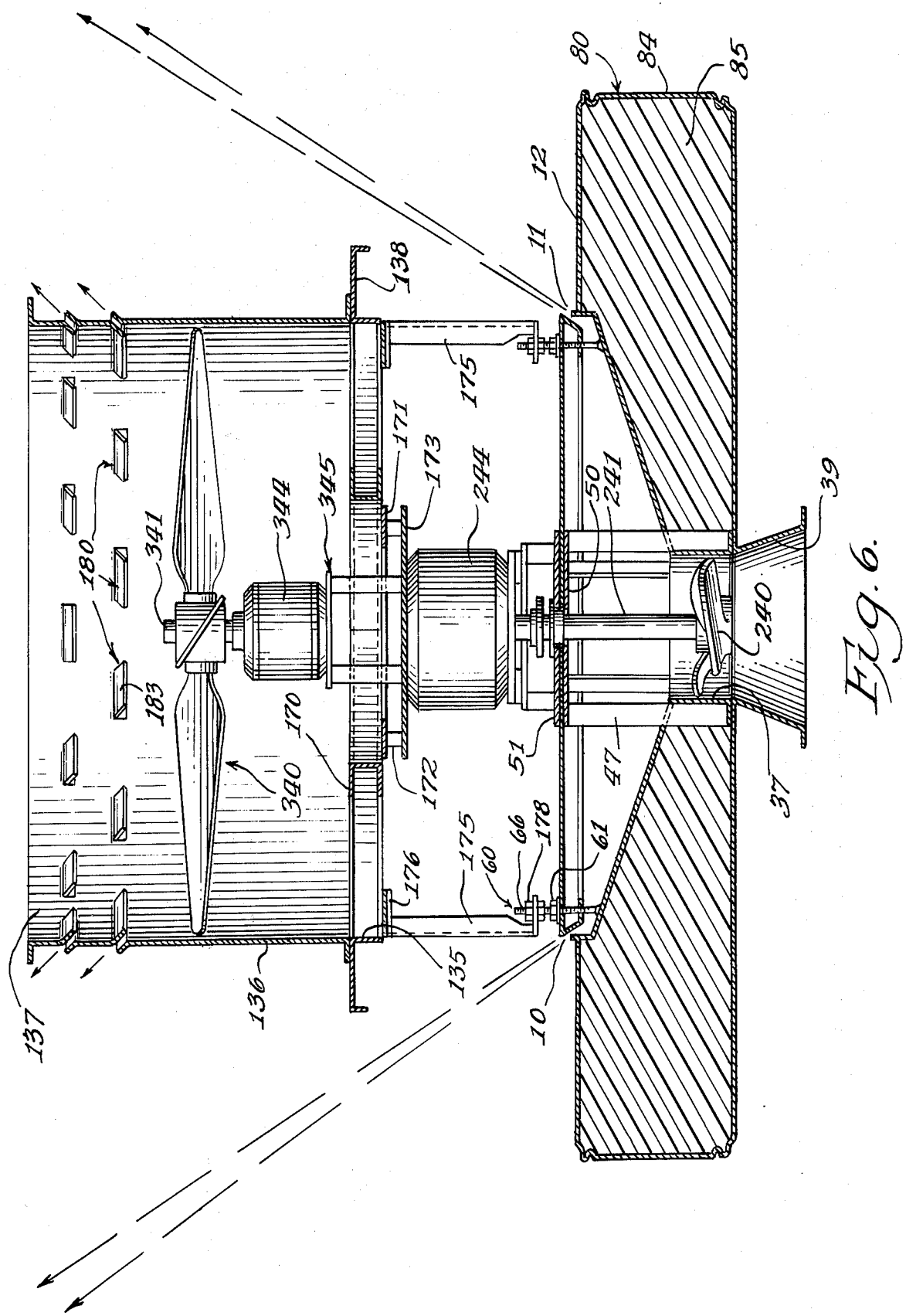

APPARATUS FOR GAS TREATMENT OF LIQUIDS

This is a continuation-in-part of Ser. No. 273,181, filed July 19, 1972, now U.S. Pat. No. 3,771,724 and a continuation of application Ser. No. 412,629, filed Nov. 5, 1973, and now abandoned.

FIELD OF THE INVENTION

This invention relates to a method and apparatus for treating liquids by spraying, for example, for cooling, condensing, humidifying or stripping of dissolved or entrained gases.

The invention is particularly useful for spray cooling of water in streams, channels, and basins and is especially useful in areas in which the movement of air is unpredictable or unreliable.

BACKGROUND OF THE INVENTION

The need for cooling, condensing, humidifying or stripping of dissolved or entrained gases from liquids is well known. The burgeoning need for cooling large volumes of water in electrical utility generating plants, industrial condensing or cooling systems, and commerical and industrial air conditioning systems also is well known. The expanding nuclear power industry in particular has been plagued currently with the problem of cooling large quantities of water in order to reduce the temperatures of the thermal discharge from generating stations for ecologically oriented reasons.

Cooling of water has been performed heretofore primarily by cooling towers and spray ponds.

Entrainment of droplets in the air traversing the spray is a problem common to both cooling towers and spray ponds. If the droplets are carried away from the cooling system, they are lost to the system and the cooling efficiency is reduced. In cooling towers drops of water are entrained in the forced draft of air. In spray ponds, a mist often is formed which can be carried away by the wind. If the water is brackish, injury to surrounding environment by water carried away by the air can produce adverse ecological disturbances. Salt water damage in areas surrounding cooling systems can be especially severe.

Very fine sized droplets can readily be entrained in moving air. In the cooling towers, the water splashes to different layers as it descends through the tower and produces droplets of various sizes, including the very fine droplets that are entrained in the draft of air through the tower. For this reason, cooling towers which employ brackish water present significant problems to the environment.

In addition to the problem of entrainment of fine water droplets, there are other difficulties in cooling towers. Cooling towers often require structures which are expensive to construct and in many cases unsightly in their appearance. Cooling towers are often plagued with an accumulation of algae so that they must be periodically cleaned. The efficiency of many cooling towers drops through the years. Ordinarily cooling towers perform at peak efficiency only when new, and the deterioration of materials allows the water to channel as a stream, and not as broken droplets, so that heat transfer efficiency drops sharply and plant operating expense increases sharply due to less effective cooling.

Spray ponds in which a number of nozzles spray water into contact with the surrounding air also are employed for cooling water. Spray ponds, however, are dependent upon wind for their highest cooling efficiency, and the construction of spray ponds necessarily have been designed to achieve the most effective use of prevailing winds in the pond area. If there is not adequate prevailing wind, or if such wind is unpredictable, the efficiency of the spray pond is similarly affected.

The efficiency of spray ponds illustrated in the foregoing patent depends to an important extent upon the wind velocity. Cooling by spraying is largely the result of some evaporation of water from the spray droplets, termed mass transfer. It will be realized, therefore, that cooling which is the sum of the mass and sensible heat transfer, is a function of the amount of air, and hence the velocity of air, traversing the water surface of the droplets during their trajectories through the atmosphere. The velocity of the air is dependent in turn ordinarily upon the natural conditions which produce wind.

The unpredictability of wind and its velocity presents a problem to cooling water by spraying. In some areas, many days have no wind, and the cooling efficiency by spraying is severly reduced.

For example, in the spray device illustrated in Ser. No. 273,181, filed July 19, 1972, now U.S. Pat. No. 3,771,724 the air traversing the spray is dependent substantially entirely upon natural conditions. At times when the wind velocity is high, the capacity of cooling by spraying in a given unit is high. If, on the other hand, the wind velocity is very low, or nil, cooling capacity can be severely reduced.

Spray devices also can be used advantageously, apart from cooling, to humidify air or to strip dissolved or entrained gas from water or liquids. In each of the foregoing uses, the velocity of the gases traversing the liquid spray is important to the capacity of the system.

SUMMARY OF THE OBJECTIVES OF THE INVENTION

A general object of the present invention is to provide a new and improved method and apparatus for maintaining a minimum rate of gas traversing a liquid spray so as to assure a minimum of heat, air, water, or gas transfer to, or from the liquid. It is desired, for instance, to provide spray devices adaptable for use in spray ponds, channels, basins and the like, with a forced air draft so that the cooling is not dependent upon natural wind conditions to produce minimum air velocities.

Another general object of the invention is to reduce the loss of liquid to a system employing a mechanically generated draft of gas through a liquid spray. Often, when fine droplets and a mist is formed, they would be carried away by movement of the gas, and it is desired to reduce such entrainment of fine droplets in a mechanical-draft of gas or air.

Related to the foregoing is the further object to provide spray cooling with droplets of a size sufficiently large to reduce the entrainment of water droplets in a mechanical draft of air.

Cooling towers usually have a forced draft system. Spray devices for cooling ponds, however, depended heretofore upon natural conditions for wind. Accordingly, another object of the invention is to provide a spray device of the type suitable for use in a pond, channel, stream and the like provided with a mechanically generated flow of gas to insure that a minimum draft traverses the liquid spray trajectory.

Related to the foregoing is the further object of the invention to improve the cooling capacity in spray cooling systems, especially in areas in which natural wind conditions are unpredictable or very low.

It is yet a still further object of the invention to provide a novel spray cooling system employing a forced-draft of air which is competitive in cooling efficiency, cost, and maintenance to induced-draft or forced-draft cooling towers. Further objects of the invention will be apparent from a review of the following specification, attached drawings and appended claims.

BRIEF DESCRIPTION OF THE DRAWINGS

FIG. 6 is a view partly in cross section of a modified form of apparatus embodying the invention.

DETAILED DESCRIPTION OF THE PREFERRED EMBODIMENTS OF THE INVENTION

Briefly stated, the present invention relates to a novel liquid spray system. In one form of the invention, the liquid is conducted from a supply conduit through a plenum chamber to a large circular nozzle in order to form a chimney of liquid spray. A draft of gas is generated within the chimney.

In a specific form of the invention, the liquid spray is composed of large size droplets, as by the method and nozzle apparatus disclosed in the parent application now U.S. Pat. No. 3,771,724, so as to reduce entrainment of the droplets of the spray in the gas flow.

In a preferred form of the invention, the liquid-spray-chimney is produced by inverted frusto-conical trajectories of spray. A mechanically generated draft of gas is produced within the liquid-spray-chimney by a motor driven fan. Suitable cowling and baffles are positioned to maximize the gas flow through the spray trajectories.

In one preferred embodiment, liquid under pressure is directed substantially radially outwardly through a chamber and then through nozzle orifices extending in circular form around the peripheral portion of the chamber from which the liquid is discharged upwardly into the atmosphere. Spraying the liquid from a large diameter, generally circular, nozzle arrangement is used to produce a chimney of liquid spray. It was discovered that the chimney of liquid spray so formed as disclosed in the parent application now U.S. Pat. No. 3,771,724, generates a natural draft of gas within such chimney. In a specific form of the invention, a mechanically generated draft of gas is produced within the chimney by a motor driven fan so as to maximize the capacity of the system.

Figure 1:
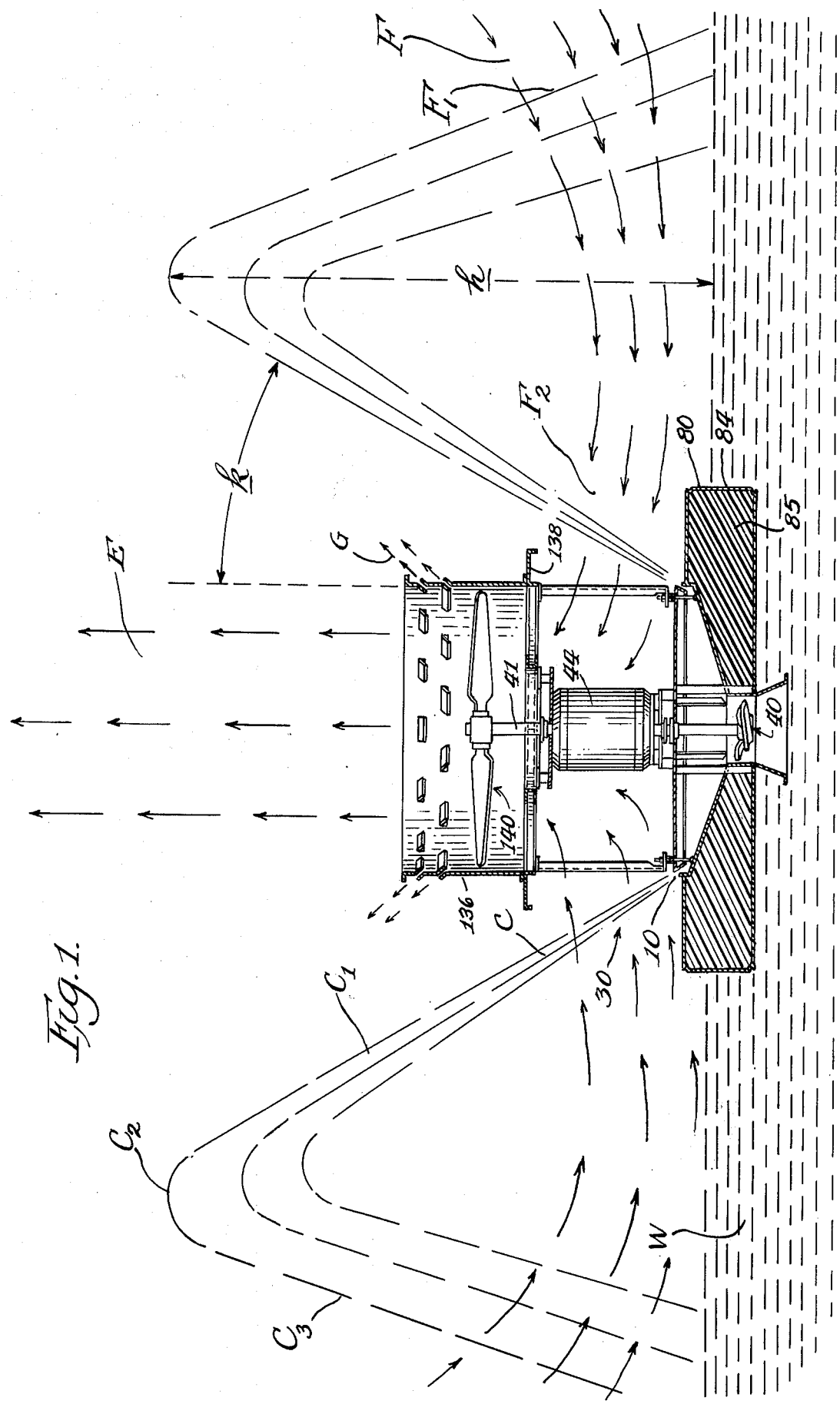
FIG. 1 is a view of an apparatus partly in cross-section embodying a preferred form of the present invention in a pond or basin of water and illustrating schematically the manner of operation.

Referring now to FIG. 1, there is shown an apparatus 30 for cooling water by spraying, illustrating the principles of the invention. The operation of the apparatus is depicted schematically in a parent body of water W. The apparatus 30 produces a chimney of liquid spray C which is projected upwardly from a circular nozzle 10. In the form illustrated, fan 70 produces an upward draft of air E within the chimney of water spray C. The upward draft E causes intake air to traverse the spray trajectories as indicated at F by an induced draft through the spray trajectories.

The parent body of water W may be a canal, stream, lagoon, tank, river, pond, or the like, which is heated, for example, by the hot water discharge of an electric utility generating facility, such as a nuclear or fossil-fuel powered electrical generating plant. The velocity of air indicated at F through the spray trajectories is at least sufficient to cool the water spray C by mass and sensible heat transfer. A predictable minimum air velocity is obtained by the forced draft of air, so that the reliance upon natural wind conditions is reduced.

Figure 2:
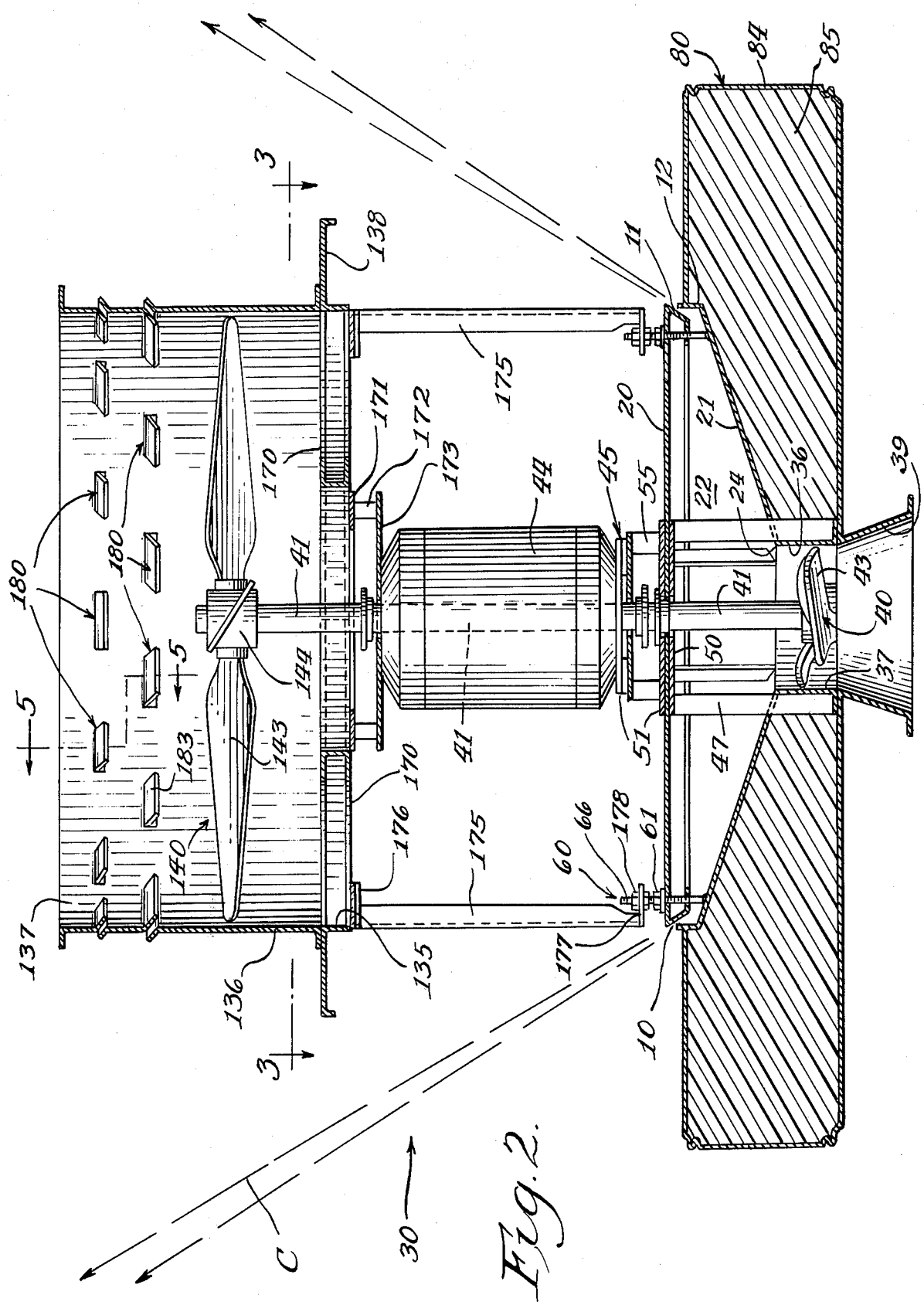
FIG. 2 is an enlarged cross sectional view of the apparatus of the invention shown in FIG. 1.

Referring now to FIG. 2, the apparatus 30 incorporates an axial-flow type pump in the form of an impeller or turbine 40 driven by motor 44. The impeller 40 includes a plurality of angularly spaced plates 43 radiating outwardly from the shaft 41 to cut through and propel the water upwardly through a conduit 36. Conduit 36, which extends vertically through the center of the unit, acts as a passage for accommodating the flow of water from the parent body W to the plenum chamber 22, as well as acting as a pump chamber bounding the blade tips of the impeller 40.

At its lower inlet end, the pump intake may depend from a throat 37 with a downwardly flaring intake shroud 39 immersed in the water, establishing an entry way into the throat 37. The unit, however, will function with or without the intake shroud, and the use of the intake shroud is to control the minimal depth below the surface at which intake water is to be withdrawn, thus controlling the mixing performance in the parent body of liquid 31. Likewise, various accessory intake arrangements are possible for spray unit 30, for example anti-erosion plates (not shown) suspended so as to discourage vertical flow directly below the intake shroud, to discourage the establishment of eddy currents, and to establish a relatively horizontal intake flow profile; intake draft tubes (not shown) for selective predetermined mixing required as progressive contacting is established through the path of the water flow in the parent body; intake screens (not shown) of a variety of designs may be employed to protect the pump from ingestion of foreign objects, and the like.

Figure 3:
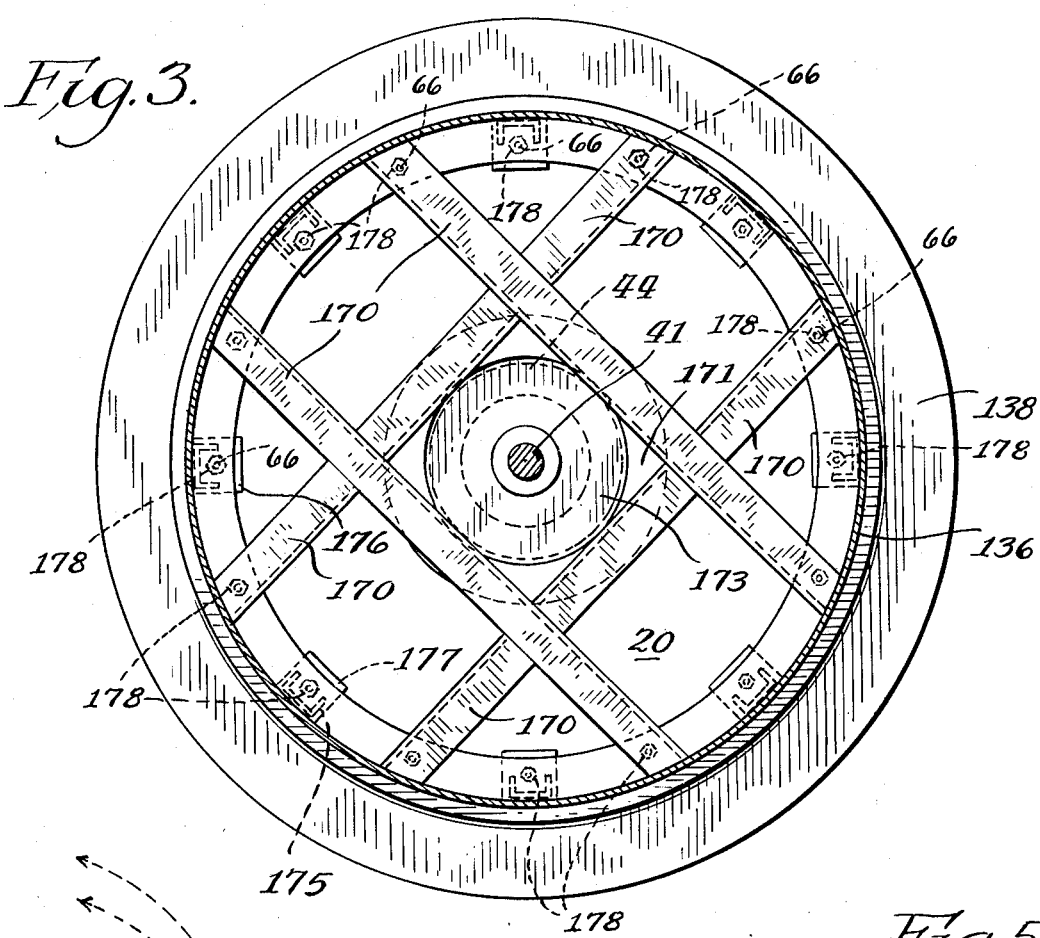
FIG. 3 is a sectional view taken substantially along line 3—3 of FIG. 2.

The impeller, or turbine 40 may be driven by an electric motor 44. While there are many different possible ways of supporting the motor, the structure shown in FIG. 3 illustrates a preferred structure.

The electric motor 44 is mounted on a platform 45 which is supported above the cover plate 20 by a plurality of upstanding legs 47. The legs extend upwardly along the outer wall of the conduit 36 from a ring 49 encircling the conduit and welded thereto. The upper end portions of the legs pass through plenum chamber 22 and define wide flow passages between the bottom wall 21 and cover plate 20, for the water to flow outwardly to the biangular nozzle 10. Supporting the platform on top of the legs is a metal disc 50 which is welded to the upper ends of the legs and includes a central opening to allow passage therethrough of the impeller shaft 41. The platform 45 is above the disc 50 and includes two spaced circular plates 51, each of which have central openings for the impeller shaft. The plates 51 are separated by braces 55 which are welded at their upper and lower ends to the plates.

In operation of spray unit 30, water is pumped upwardly from the parent body 31 through shroud 39, throat 37, conduit 36, and then diffused laterally by the plenum chamber 22 toward the circular orifice 10. The circular nozzle orifice 10 projects the water upwardly into the air in an inverted frustoconical configuration of a diameter and height to form a chimney of water spray as schematically depicted in FIG. 1.

A device for creating a force draft of air within the chimney of water spray will now be described. Motor shaft 41 is double ended. The lower end of the shaft 41 drives impeller 40. The upper end of the shaft 41 mounts a fan 140. The fan includes a plurality of angularly spaced fan blades 143 radiating outwardly from the fan hub 144 which is secured to shaft 41.

The motor 44 thereby rotates both impeller 40 and fan 140. The impeller 40 supplies the water under pressure to the nozzle 10. The fan produces an upward forced draft of air within the center of the chimney of liquid spray.

The fan 140 rotates within a cowling 136 which is in the form of tubular conduit formed of sheet metal. The cowling 136 has a lower intake opening 135 and an upper exhaust opening. The lower intake opening 135 is spaced above the plenum chamber cover plate 20 a distance sufficient so at to provide an air intake area for the fan 140 through the water spray C. The exhaust opening 137 is spaced above the fan a distance sufficient to direct substantial amounts of the air supplied to the draft generated by the fan through the intake opening 135.

It is desirable to have all the intake air to the fan 140 traverse the spray C in order to achieve maximum efficiencies. There is a tendency, however, for some air to enter the intake opening 135 through a path along the outer wall of cowling 136. In order to reduce such air flow, suitable baffles may be employed. For instance, a baffle 138 in the form of a ring is secured to the cowling 136. The outer edge of baffle 138 is adjacent the inner edge of the liquid spray C so as to reduce the amount of intake air passing between the cowling 136 and the spray.

The cowling 136 is supported by cross braces 170 (see FIG. 3) mounted by annular ring 171, brackets 172 and platform 173 on motor 44. The cowling is supported at the wall by legs 175 spaced around the circumference. The legs 175 have bent end flanges at the top 176 and bottom 177. The bottom flanges 177 are secured to bolts 66 between pairs of nuts 178 as best shown in FIG. 2.

There is a tendency for a film of water to collect on the interior surface of the cowling 136, as by droplets projected thereagainst by the fan blades 143. The water film moves to outlet end 137 and would be projected upwardly as a fine mist in the upward draft of air E. Such mist may drift away from the spray pond W, be lost to the system, and, in the case of salt water, cause damage to the surrounding environment. In order to prevent the film from being projected as a mist in the air draft E, louvers 180 are mounted in the wall of the cowling 136 for discharging the water collected in the cowling into the spray C.

Figure 5:
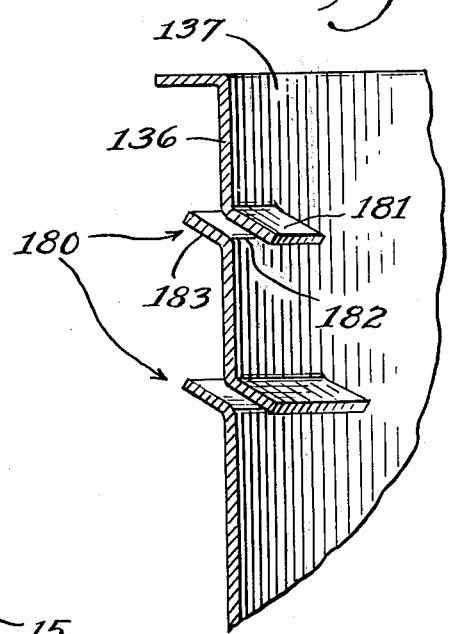
FIG. 5 is a sectional view taken substantially along line 5—5 of FIG. 2.

As best shown in FIG. 5, the louvers have inner slats 181 above the slotted openings 182 for directing the water film exteriorly of the cowling 136. The air pressure created by the fan 140 within the cowling will create a jet air stream through the openings 182 and propel the water film outwardly as indicated by the arrows G in FIG. 1. Slats 183 exterior to the cowling and below openings 182 assist in guiding the air jets.

As shown, for example in FIG. 2, the louvers 180 are staggered in a plurality of rows so that the total number of louvers at least substantially traverse the entire circumference of the cowling. An upper row contains louvers 180 spaced from each other circumferentially around the cowling 136, and a lower row contains spaced louvers positioned in locations in line with the space between the upper row of louvers, so that the water film is caught in either the lower group of louvers or in the upper group of louvers.

Referring to FIG. 1, it will be noted that the spray C leaving nozzle 10 is directed upwardly in a frustoconical configuration indicated by $C_1$. The spray droplets reach the peak of their trajectory indicated at $C_2$, after which they fall back into the spray pond along a path indicated by $C_3$. It is desirable to maximize the intake air traversing the spray particles during their trajectory.

Many types of spray nozzles tend to produce a continuous sheet of liquid extending outwardly from the nozzle orifice. Such a sheet of liquid eventually breaks and shatters into spray particles, but would tend to create a barrier to the passage of air for some distance depending upon the extent and thickness of the liquid sheet emerging from the nozzle. Accordingly, it is desirable to produce a spray that exists in droplet form substantially immediately as it exists from the nozzle.

The droplets produced by the spray nozzle, moreover, cannot be of a very fine size which will be swept into the intake air moving to the fan 140. Therefore, while it is desirable to produce droplets in the spray C, the droplets have to be of a size sufficiently large to reduce entrainment in the draft of air supplied to the fan. In addition, cooling by both sensible and mass heat transfer is related to the size of the droplets, and, generally speaking, apart from loss to the system of droplets as might be carried away by a mist, cooling efficiently increases as the average droplet size decreases. In summary, the nozzle 10 preferably should produce water droplets of an optimum minimum size.

Figure 4:
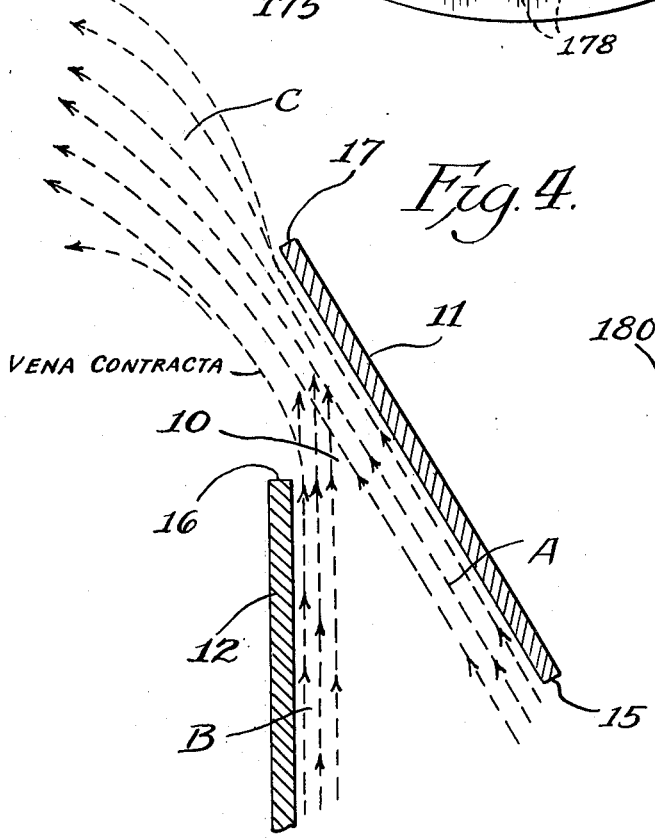
FIG. 4 is an elarged fragmentary, diagrammatic view of a nozzle employed in the invention which schematically illustrates the manner in which the large droplets in the spray are formed.

Referring to FIG. 4, a nozzle illustrating the principles for forming droplets of optimum size is diagrammatically depicted, as is more fully shown and described in parent application Ser. No. 273,181, now U.S. Pat. No. 3,771,724.

As schematically depicted in FIG. 4, liquid under pressure is supplied to the nozzle orifice 10 from which it is projected into the atmosphere as it is guided along the surface of wall member 11. The wall member 11 extends from an inlet end 15 to an outlet end 17, the latter of which terminates at a point downstream from the orifice 10. The inlet end 15 is positioned a distance upstream of the orifice 10 sufficient for generation of a unidirectional sheet of liquid A along wall 11, which sheet is laminar adjacent the wall 11, that is conducted downstream to, and outside of, the orifice. A second wall 12 is positioned to generate a second unidirectional sheet of liquid B along wall 12, which second sheet is laminar adjacent wall 12, and to direct such second sheet B for intersection with the first sheet A along the extent of wall 11 exterior to the orifice and before the end 17. The resulting stream of liquid C formed by intersecting sheets A and B is turbulent and unstable, and disrupts and shatters into droplets at it is projected into the atmosphere.

The second wall member 12 has an inlet end 14 and an outlet end 16, the latter of which is spaced from the wall member 11 to form the orifice 10. The outlet end of the wall 12 is spaced from and positioned so that the two sheets A and B intersect within the extent of wall 11 between the inlet end 15 and the discharge end 17. The distance between the end 16 of wall 12 and wall 11 is substantially constant along the peripheral edge of end 16, but may be selectively adjusted in order to vary the thickness of the resulting sheet C and to change the droplet size as will be more fully explained hereinafter. The end 16 of wall 12 is spaced from wall 11 so that the total area of the orifice 10 is less than the supply conduit in order to obtain a predetermined increase in the velocity pressure head of the liquid relative to the static head at the nozzle orifice.

The wall 12 is offset from parallel with respect to wall 11 at an acute angle so that the liquid sheet on wall 12 intersects liquid sheet on wall 11 at an acute angle. The acute angle between wall 12 and wall 11 illustrated in the drawings is 30°, although it may vary widely in the range from about 10° to about 45°. The orifice between the walls 11, 12 normally would produce a vena contracta in the discharged stream.

The wall 11 extends at least beyond a point corresponding to the inside surface of wall 12 if the latter were extended beyond orifice 10. The wall 11 thereby provdes an area for intersection of the two sheets and for effectively guiding the trajectory of the emerging stream. It has been determined that a majority of the droplets produced by the nozzle of the invention are in the size range from 0.25 inch to about 0.75 inch. It has also been determined that the spray produced by the nozzle of the invention is substantially free from droplets of a size less than about 30 microns which cause mist that can drift.

Referring now to FIG. 2, there is illustrated the form of nozzle depicted in FIG. 4 employed in the water cooling unit of the invention. The nozzle orifice 10 is circular. The first wall 11 is in the form of an inverted frusto-cone supported on a generally horizontally extending cover plate 20. The second wall 12 is in the form of a cylinder encompassing the lower portion of the frusto-conical wall 11. Wall 12 is supported by a plate 21. The space between plates 20 and 21 defines a plenum chamber 22 for distributing liquid from a pressure source through inlet 24 to the nozzle orifice 10. The liquid under pressure is supplied by impeller 40 through conduit 36 to plenum chamber 22.

The liquid under pressure enters the spray unit through inlet 24 and then is distributed substantially radially outwardly through the plenum chamber 22 to the nozzle orifice 10 from which it is projected at C into the atmosphere. In the nozzle, two sheets are produced by biangular walls 11 and 12. The sheet produced by wall 12 intersects the sheet produced on the wall 11 to create the unstable condition in the resulting stream C projected into the atmosphere so that the stream C disrupts and shatters into the droplets, as explained heretofore in connection with FIG. 4.

It will be noted that the trajectory of the stream C, and hence the dwell time of the droplets in the atmosphere, is controlled by the angle of wall 11. The wall 11 may be at an angle offset from vertical in a wide range, for example, from 10° to 45°. In the device shown in FIG. 2, the trajectory of the stream C can be changed by changing the angle of wall 11, which may be accomplished by substituting another cover plate 20 having the wall 11 offset at a different angle.

It will be noted that the end of wall 12 is spaced from wall 11 a predetermined substantially fixed amount throughout the circular extent of wall 12. The predetermined spacing controls the size of the droplets throughout the extent of the nozzle 10. The total area between wall 12 and wall 11 is less than the cross-sectional area of the supply conduit 24 in order to increase the velocity pressure head relative to the static pressure head at the nozzle orifice 10.

The radial width of the circular orifice 10 in the spray unit 30 is substantially the same throughout the length thereof. The radial width may be selectively adjusted, however, to change the thickness of the stream C and thus the characteristics of the resulting spray. If the temperature and humidity of the air are high (e.g., in the summer), the radial width of the orifice may be reduced to decrease the thickness of the sprayed sheet and thus cause the formation of smaller water droplets which are capable of losing heat more rapidly. If temperature and humidity considitions are more favorable as in the winter, the radial width of the orifice may be made greater to increase the thickness of the sheet and cause the formation of larger droplets when the sheet disintegrates. The larger droplets are more stable and are not as susceptible to being blown by the wind into areas surrounding the parent body. Thus, the creation of larger droplets results in a reduction in the possibility of wind drift beyond the channel or basin of the parent body of water giving control of precipitation which might wet the surrounding areas, while the creation of smaller droplets results in greater heat transfer and therefore greater cooling under high temperature and humidity conditions. In addition to being adjusted in accordance with the temperature and humidity conditions, the orifice also may be increased or decreased in width depending upon whether cooling requirements are low or high.

To adjust the width of the orifice 10 in spray unit 30, the cover plate 20 is flexible vertically so that its outer edge 29 may be adjusted selectively in height relative to the bottom wall 21 of the chamber 22. Vertical movement of the peripheral outer edge of the cover plate 20 controls the width of the orifice because the wall 11 tapers downwardly and inwardly above the outlet end of wall 12. As the cover plate 20 is flexed upwardly, the orifice 10 is opened wider because the distance between the outlet end of wall 12 and the wall 11 is increased. Conversely, as the outer edge of cover plate 20 is flexed downwardy, the orifice is decreased in the width. To move the cover 46 up and down, and thus adjust the size of the orifice 10, angularly spaced bolts 60 are fastened to the bottom wall 21 of the chamber 22 and extend upwardly through the chamber and through openings in the cover plate 20.

As indicated generally in FIG. 4, collar-and-nut assemblies 61 are screwed on threaded end of bolts 60 to hold the cover plate in a selected vertical position and may be threaded upwardly or downwardly on the bolts 60 to adjust the height of the outer edge 29 of the cover plate 20 relative to the bottom wall 21 of the chamber 22. Thus, the outer edge of the cover plate 20 may be deflected upwardly or downwardy to control the width of the orifice 10 to any selected width using a spacer gauge for a uniform width around the periphery if desired.

The unit 30 may be supported in a parent body of liquid W by any suitable means, such as by overhead supports, underwater piers and stands, or by floats. As illustrated in FIG. 1, the spray unit 30 may be supported on the surface of the parent body of liquid by bouyant float 80. The spray unit on the float may be moored at a given location in the body of water by stringing cables (not shown) from the shore to the eyes (not shown) angularly spaced around the periphery of the float. The float may be formed of a stainless steel outer shell 84 which is filled with a low density material 85, such as polyurethane foam. Although other systems forms for supporting the apparatus may be used as heretofore mentioned, the float supported unit has proved to be particularly advantageous for many applications.

The spray nozzle may assume various configurations. Although a continuous circular nozzle is shown and described herein, it will be readily apparent that a pluraltiy of nozzles can be employed which by their combined trajectories can be patterned to form a conduit or chimney of liquid spray. Various forms and arrangements of nozzles, therefore, are contemplated.

The fan may be driven by a separate motor as illustrated, for example, in FIG. 6. In the modified form of apparatus shown in FIG. 6, the structure is identical to that shown in FIG. 2, except two motors are employed. Motor 244 rotates drive shaft 241 for rotating impeller 240. Another motor 344 drives shaft 341 for rotating fan 340. A suitable supporting platform 345 is provided for motor 344.

There are several advantages which arise from the use of two separate motors for the fan and impeller. Each motor can be designed for its specific use; the motor 344 can be designed to the torque requirements of fan 340, and the motor 244 can be designed to the torque requirements of impeller 244. Moreover, the motor 344 can be controlled by a separate electrical switch so that it can be shut off when the natural wind conditions do not require the use of fan 340.

Although a single fan is shown and described in the drawing, it will be realized that in some instances multiple fans preferably might be used. In such case, a plurality of fans (not shown) would be rotated within the conduit formed by spray C.

The fan illustrated in the drawings mechanically generates an upward draft of gas in an induced draft system. The invention also contemplates various types of forced-draft systems, as for instance by directing the exhaust from the fan means downwardly toward the plate 20 on the float 80 for deflection of the gas radially outwardly through the spray C. The induced draft system will be preferred for many applications.

It also is contemplated that in certain circumstances the impeller 40 may be eliminated, for instance, in cases in which the liquid to the apparatus is supplied under sufficient pressures to project spray trajectories of the desired height. For example, the effluent water from an electric power utility plant may be supplied directly to chamber 22 through conduit 36 without using an impeller.

There has been described above in connection with FIGS. 1 to 6 several preferred units embodying the principles of the invention. Referring to FIG. 1, and using a water cooling spray pond by way of example, water is sprayed from circular nozzle 10 as indicated by C. The spray C in its trajectory rises at $C_1$, reaches the peak of its trajectory at $C_2$, and then falls back into the spray pond W along a path indicated by $C_3$. The angle of the upward portion of the spray trajectory *k* and the height of the trajectory *h* are designed so as to produce a conduit of chimney of water spray within $C_1$. The mechanically generated draft of air E within the chimney is designed with the objective of drawing maximum amounts of intake at both $C_3$ and $C_1$. As indicated, it is desirable to pass the intake air F through the spray trajectory at $F_1$ and again at $F_2$ in order to maximize heat transfer.

It has been found that a satisfactory conduit of water spray can be produced by projecting the spray upwardly at $C_1$ from an angle *k* offset from vertical in the range from about 10° to about 45°; for instance as shown in the drawings at an angle offset from vertical of about 30°. In such case the spray $C_1$ has a frusto-conical configuration, for example, with the diameter of the circular nozzle 10 about 8 feet and the height *h* of the spray from about 15 feet to about 17 feet.

The advantages of the invention should be clear from the foregoing description. The circular nozzle 10 produces a conduit-shaped spray pattern which is in the form of an inverted, substantially frusto-conical configuration that substantially completely encloses a mechanically generated draft of gases produced by fan 140. In this way the transfer of gases to and from the droplets is increased, and in the case of cooling water, for example, the dependence upon natural wind conditions for minimum cooling capacities is reduced. Entrainment of spray droplets in the draft of gases is reduced by the biangular nozzle construction described hereinabove in which the formation of very fine sizes of droplets is reduced.

In the drawings and specification, there has been set forth preferred embodiments of the invention, and although specific terms are employed, these are used in a generic and descriptive sense only, and not for the purpose of limitation. Changes in form and proportion of parts, as well as substitution of equivalents are contemplated, as circumstances may suggest or render expedient, without departing from the spirit and scope of this invention, as further defined in the following claims:

We claim:

1. An apparatus for treating liquids comprising:
means for spraying liquid upwardly above the surface of a parent body of liquid in a substantially inverted frusto-conical trajectory path so as to produce a chimney of liquid spray having a measurable height and an inner diameter,
cowling means positioned substantially inside the trajectory frusto-conical spray chimney for conducting a draft of atmospheric gases through the central portion of the spray,
said cowling means having inlet and outlet openings positioned below the height and within the inner diameter of the chimney of liquid spray, and
fan means within said cowling means for mechanically generating a draft of gas through the inner portion of said frusto-conical liquid spray so that atmospheric gases are caused to travese the spray.

2. The apparatus of claim 1 in which said inlet opening adapted to be spaced above the surface of a parent body of liquid.

3. The apparatus of claim 1 in which said spray means comprises a substantially circular nozzle means for directing the liquid spray, and chamber means for distributing the liquid substantially radially to said nozzle means.

4. An apparatus for treating liquids comprising:
cowling means for directing substantially vertically a draft of gases into the atmosphere, said cowling means having an outlet opening and an inlet opening, power driven fan means for mechanically generating a draft of gases within said cowling means, nozzle means for spraying liquid in a pattern for at least substantially enclosing said exterior surface of said cowling means so as to provide a curtain of liquid spray to be traversed by the draft of gases entering the inlet opening of said cowling means, and means for supplying liquid to said nozzle means under pressures sufficient to project substantial portions of the spray droplets to a height above the top of said cowling means.

5. The apparatus of claim 4 in which said nozzle means is positioned in a substantially circular arrangement.

6. The apparatus of claim 4 in which said nozzle means projects the liquid upwardly in a generally inverted frusto-conical trajectory.

7. An apparatus for treating liquids, and which is adapted to effect improved cooling, condensing, humidification, or stripping of dissolved or entrained gases, comprising in combination:

cowling means for directing a draft of gases substantially vertically, power driven fan means within said cowling means for generating said draft of gases, conduit means for supplying liquid under pressure to said apparatus, chamber means connected to said conduit means for conducting the liquid radially outwardly for spraying into the atmosphere, nozzle means communicating with said chamber means for projecting the liquid upwardly with spray trajectories in sufficient proximities to said draft of gases so that atmospheric gases entering said cowling means are caused to traverse said spray trajectories, and said nozzle means having a diameter sufficiently large so as to project said liquid spray with a trajectory larger in diameter than said cowling means and to a height above said cowling means.

8. The apparatus of claim 7 in which said nozzle means is substantially circular in its extent.

9. The apparatus of claim 7 in which said nozzle means projects the liquid into the atmosphere in upward spray trajectories that are substantially frusto-conical.

10. An apparatus for treating liquids, comprising:

support means for supporting said apparatus in a parent body of liquid, cowling means for directing gases into the atmosphere, fan means for mechanically generating the draft of atmospheric gases within said cowling means, and nozzle means for projecting liquid spray droplets upwardly from a point adjacent the surface of said parent body of liquid with spray trajectories in sufficient proximities to and outside said cowling means so that atmospheric gases entering the cowling means are caused to traverse the liquid spray.

11. The apparatus of claim 10 which is further characterized by chamber means for distributing the liquid substantially radially outwardly to said nozzle means.

12. In an apparatus for treating liquids which is adapted to effect improved cooling, aeration, condensing, humidification, or stripping of dissolved or entrained gases, the combination comprising:

conduit means for supplying liquid under pressure to said apparatus, chamber means connected to said conduit means for conducting the liquid radially outwardly for spraying into the atmosphere, nozzle means communicating with said chamber means for projecting the liquid upwardly with spray trajectories of a height, of a diameter, and of a configuration sufficient to produce a chimney of liquid spray, cowling means having a diameter less than said nozzle means and positioned within the diameter of said chimeny of liquid spray for directing gases into the atmosphere, and fan means within said cowling means for generating a draft of gases.

13. An apparatus for treating liquids comprising:

means for spraying liquid upwardly above the surface of a parent body of liquid in a substantially inverted frusto-conical trajectory path so as to produce a chimney of unconfined liquid spray; and means positioned substantially inside the trajectory path of the frusto-conical spray of liquid for conducting a draft of atmospheric gases upwardly through the central portion of the spray, so that said atmospheric gases are caused to traverse, contact and cool said liquid spray.

14. The apparatus of claim 13 in which said spray means comprises a substantially circular nozzle means for directing and distributing the liquid substantially radially to said nozzle means; and pumping means for supplying liquid to said nozzle means at pressures sufficient to project substantial portions of said liquid spray to a height above the draft inducing means.

15. An apparatus for treating liquids comprising:

means for spraying an unconfined pattern of liquid of predetermined height and shape from a parent body of liquid so as to provide a curtain of falling liquid spray;

fan means, positioned within and below the height of said curtain of falling liquid spray, for directing a draft of atmospheric gases through said liquid spray so as to intersect, contact and cool said curtain of falling liquid spray before it returns to said parent body of liquid.

16. The apparatus of claim 15 wherein said spray means projects said liquid spray to a height of between about 15 to 17 feet above the surface of said parent body of liquid.

17. The apparatus of claim 15 wherein said spray means projects said liquid spray in a substantially frusto-conical trajectory.

18. The apparatus of claim 13 in which said spray means comprises a substantially circular nozzle means for directing and distributing the liquid substantially radially to said nozzle means, and pumping means for supplying liquid to said nozzle means at pressures sufficient to project substantial portions of said liquid spray to a height above the uppermost point in said fan means.

19. An apparatus for treating liquids comprising:

fan means for mechanically generating and upwardly directing a draft of gases into the atmosphere, nozzle means for spraying liquid in a pattern so as to provide a curtain of liquid spray to be traversed and contacted by said draft of gases, and means for supplying liquid to said nozzle means under pressures sufficient to project substantial portions of the liquid spray to a height above the top of said fan means.

20. The apparatus of claim 19 in which said nozzle means is positioned in a substantially circular arrangement.

21. The apparatus of claim 19 in which said nozzle means projects the liquid upwardly in a generally inverted frusto-conical trajectory.

22. An apparatus for treating liquids, and which is adapted to effect improving cooling, condensing, humidification, or stripping of dissolved or entrained gases, comprising in combination:
   power driven fan means for generating and directing a draft of gases substantially vertically,
   conduit means for supplying liquid under pressure to said apparatus,
   chamber means connected to said conduit means for conducting the liquid radially outwardly for spraying into the atmosphere,
   nozzle means communicating with said chamber means for projecting the liquid upwardly with spray trajectories in sufficient proximities to said draft of gases so that atmospheric gases being directed by said fan means are caused to traverse and contact said spray trajectories without interrupting said spray trajectories, and
   said nozzle means having a diameter sufficiently large so as to project said liquid spray in a trajectory larger in diameter than said fan means and to a height above said fan means.

23. The apparatus of claim 22 in which said nozzle means is substantially circular in its extent.

24. The apparatus of claim 22 in which said nozzle means projects the liquid into the atmosphere in upward spray trajectories that are substantially frusto-conical.

25. In an apparatus for treating liquids which is adapted to effect improved cooling, aeration, condensing, humidification, or stripping of dissolved or entrained gases, the combination comprising:
   conduit means for supplying liquid under pressure to said apparatus,
   chamber means connected to said conduit means for conducting the liquid radially outwardly for spraying into the atmosphere,
   nozzle means communicating with said chamber means for projecting the liquid upwardly with spray trajectories of a height, of a diameter, and of a configuration sufficient to produce a chimney of liquid spray, and
   fans means, positioned within the diameter of said chimney of liquid spray, for generating and directing a draft of gases upwardly through said chimney of liquid spray.

26. The apparatus of claim 25 in which said nozzle means projects the liquid upwardly in a frusto-conical configuration to a height above the top of said fan means.

27. An apparatus for treating liquids, comprising:
   support means for supporting said apparatus in a parent body of liquid,
   cowling means for directing gases into the atmosphere,
   fan means for mechanically generating the draft of atmospheric gases within said cowling means, and
   nozzle means for projecting liquid spray droplets upwardly from a point adjacent the surface of said parent body of liquid with spray trajectories in sufficient proximities to and outside said cowling means so that atmospheric gases entering the cowling means are caused to traverse the liquid spray and with at least some of the spray trajectories exceeding the height of the apparatus.

* * * * *